United States Patent
Khalaj Amineh et al.

(10) Patent No.: US 11,248,458 B2
(45) Date of Patent: Feb. 15, 2022

(54) DOWNHOLE ELECTROMAGNETIC CORROSION DETECTION USING KNOWN PIPE FEATURES AND NATURAL PIPE VARIATION REJECTION

(71) Applicant: HALLIBURTON ENERGY SERVICES, INC., Houston, TX (US)

(72) Inventors: Reza Khalaj Amineh, Houston, TX (US); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 917 days.

(21) Appl. No.: 15/779,793

(22) PCT Filed: Dec. 28, 2016

(86) PCT No.: PCT/US2016/068812
§ 371 (c)(1),
(2) Date: May 29, 2018

(87) PCT Pub. No.: WO2018/125073
PCT Pub. Date: Jul. 5, 2018

(65) Prior Publication Data
US 2021/0172313 A1    Jun. 10, 2021

(51) Int. Cl.
*E21B 47/00* (2012.01)
*E21B 47/085* (2012.01)
*E21B 47/13* (2012.01)
*E21B 47/01* (2012.01)
*G01N 17/04* (2006.01)

(52) U.S. Cl.
CPC ............ *E21B 47/006* (2020.05); *E21B 47/01* (2013.01); *E21B 47/085* (2020.05); *E21B 47/13* (2020.05); *G01N 17/04* (2013.01)

(58) Field of Classification Search
CPC ...... E21B 47/006; E21B 47/085; E21B 47/13; E21B 47/01; G01N 17/04
USPC ....................................... 340/854.6
See application file for complete search history.

(56) References Cited

U.S. PATENT DOCUMENTS

| 6,359,434 B1 * | 3/2002 | Winslow ............ G01N 27/9046 324/220 |
| 2006/0202685 A1 | 9/2006 | Barolak et al. |
| 2009/0195244 A1 | 8/2009 | Mouget et al. |

(Continued)

FOREIGN PATENT DOCUMENTS

WO    2012051136 A1    4/2012

OTHER PUBLICATIONS

International Search Report and Written Opinion; PCT Application No. PCT/US2016/068812; dated Sep. 13, 2017.

(Continued)

*Primary Examiner* — Kerri L McNally
(74) *Attorney, Agent, or Firm* — Polsinelli PC

(57) ABSTRACT

A method of filtering measured responses of downhole pipes, obtained by electromagnetic (EM) logging tools, to correct for natural variations in downhole pipes during downhole pipe defect characterization. A further method of directly characterizing downhole pipe defects by obtaining measured responses at known pipe features, such as casing collars. An apparatus and system for characterizing downhole pipe corrosion is also disclosed.

17 Claims, 7 Drawing Sheets

(56) References Cited

U.S. PATENT DOCUMENTS

| | | |
|---|---|---|
| 2010/0206064 A1 | 8/2010 | Estes |
| 2014/0080224 A1* | 3/2014 | Tunheim ................. G01M 3/38 |
| | | 436/164 |
| 2016/0070018 A1* | 3/2016 | Nichols ................... G01V 3/28 |
| | | 324/339 |
| 2016/0161627 A1 | 6/2016 | Khalaj Amineh et al. |
| 2016/0290122 A1* | 10/2016 | San Martin .............. G01V 3/28 |

OTHER PUBLICATIONS

J. Garcia et al., "Successful application of a new electromagnetic corrosion tool for well integrity evaluation in old wells completed with reduced diameter tubular," IPTC 16997.

A. A. Arbuzov et al., "Memory magnetic imaging defectoscopy," SPE 162054.

J. W. Goodman, "Introduction to Fourier Optics" (McGraw-Hill, 1996).

R. Zoughi, "Microwave Nondestructive Testing and Evaluation" Summary. Kluwer Academic Publishers, The Netherlands, 2000.

R. K. Amineh et al., "Microwave holography using point-spread functions measured with calibration objects," IEEE Transactions on Instrumentation and Measurement, vol. 64, No. 2.

\* cited by examiner

DOWNHOLE ELECTROMAGNETIC CORROSION DETECTION USING KNOWN PIPE FEATURES AND NATURAL PIPE VARIATION REJECTION

CROSS-REFERENCE TO RELATED APPLICATIONS

This application is a national stage entry of PCT/US2016/068812 filed Dec. 28, 2016, said application is expressly incorporated herein in its entirety.

FIELD

The present disclosure relates to monitoring the condition of casing strings, tubing, and other pipes in subterranean wellbores. In particular, the present disclosure relates to methods, systems, and devices for electromagnetic detection of corrosion in downhole pipes.

BACKGROUND

Wellbores are drilled into the earth for a variety of purposes including tapping into hydrocarbon bearing formations to extract the hydrocarbons for use as fuel, lubricants, chemical production, and other purposes. The drilled wellbore is completed by cementing a string of metal pipes connected end-to-end within the wellbore, commonly called "casing" or a "casing string." Casing increases the integrity of the wellbore, inhibits formation fluids from infiltrating the wellbore and prevents produced fluids from migrating into adjacent formations. Some wellbore installations include multiple concentric casing strings secured in the wellbore, each having a smaller diameter, in order to facilitate drilling, completion, production, and enhanced recovery operations.

During the lifetime of the well, the casing may be subject to corrosion that may affect the structural integrity of the casing string. Accordingly, the accurate and effective downhole monitoring of the casing and casing string corrosion may be useful in preventing and mitigating pipe integrity failures. Effective monitoring in wellbores having multiple concentric casing strings is especially challenging since the outermost casing pipe must be monitored from within the innermost pipe. Therefore any monitoring tool or system must be capable of sensing through a number of pipe layers, each of which may have developed distinct defects. In addition, monitoring the condition of other downhole pipes and metallic components, such as tubing, collars, filters, packers, and perforations is essential to reducing cost and risk in oil and gas field operations. As a result, downhole corrosion monitoring techniques that provide pipe defect characterization with improved resolution are desirable.

BRIEF DESCRIPTION OF THE DRAWINGS

In order to describe the manner in which the advantages and features of the disclosure can be obtained, reference is made to embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
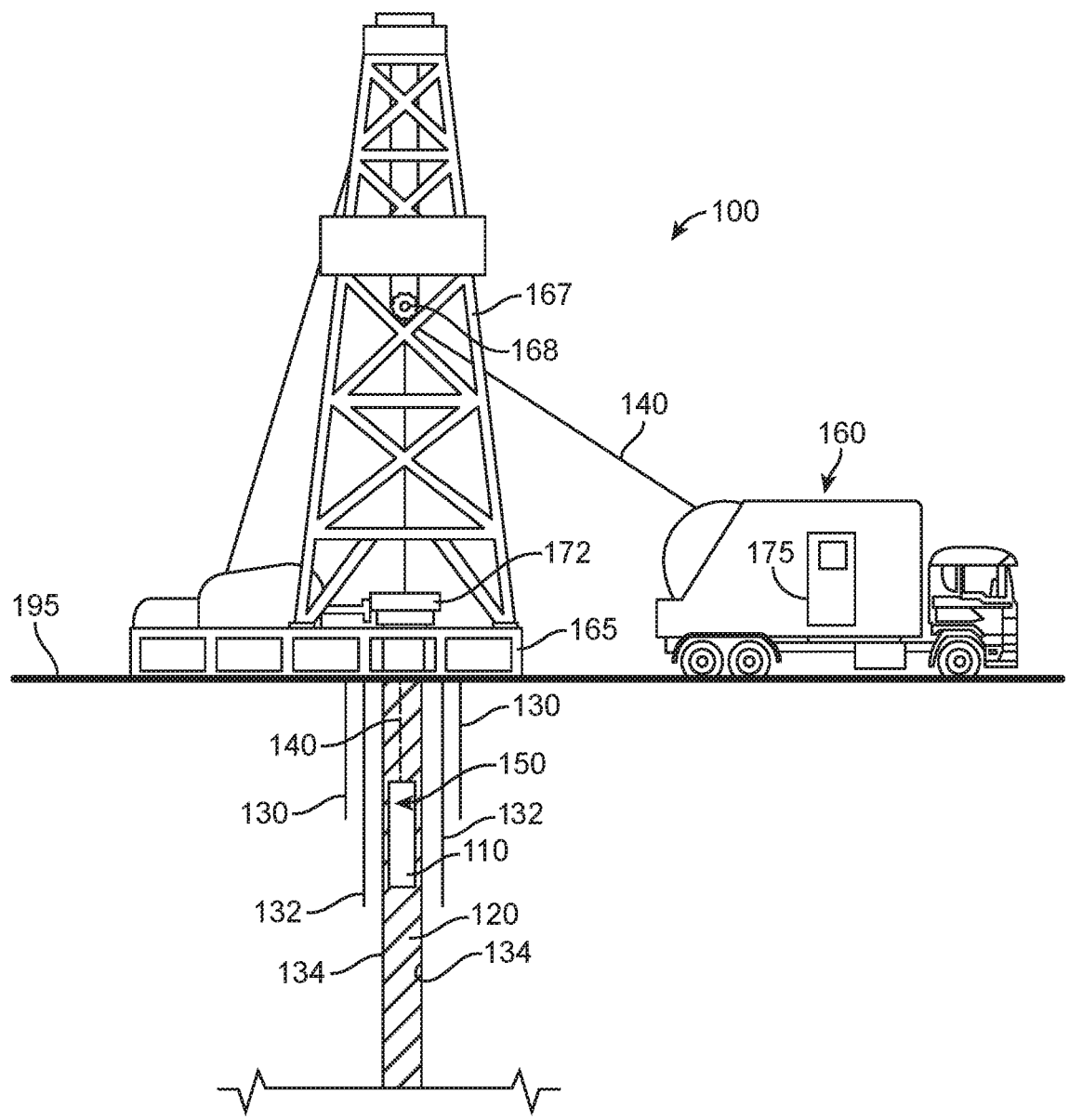
FIG. 1 is a diagram of a wellbore operating environment in which an apparatus, method, and system, having an electromagnetic (EM) logging tool, may be deployed, according to an exemplary embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

Unless otherwise specified, any use of any form of the terms "connect," "engage," "couple," "attach," or any other term describing an interaction between elements is not meant to limit the interaction to direct interaction between the elements and also may include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "uphole" meaning toward the surface of the wellbore and with "down," "lower," "downward," "downstream," or "downhole" meaning toward the terminal end of the well, regardless of the wellbore orientation. As used herein, the term "downhole pipe" refers to any substantially tubular downhole metal or non-metal body or set of metal or non-metal bodies that may be connected end-to-end, such as a casing string. Non-limiting examples of "downhole pipes," as defined in the present disclosure, may include casing, casing string, production tubing, tubing, coiled tubing, a filter, and a packer. The various characteristics described in more detail below, will be readily apparent to those skilled in the art with the aid of this disclosure upon reading the following detailed description, and by referring to the accompanying drawings.

The present disclosure generally relates to an apparatus, method, and system for characterizing corrosion defects on downhole pipes, such as casing strings or production tubing, using electromagnetic (EM) logging tools. According to the present disclosure, downhole pipe defects may be characterized directly from responses measured by EM logging tools by obtaining measured responses at known pipe features rather than relying solely on pre-constructed libraries of measured responses for downhole pipes having variable properties. The present disclosure further provides a method of filtering measured responses to correct for natural variations in downhole pipes during downhole pipe defect characterization.

As disclosed herein, an electromagnetic (EM) logging tool can be employed to make a plurality of measurements of a downhole pipe. The plurality of measurements are taken along a length (i.e., depth) of the downhole pipe that can be divided into several depth regions, namely, at least one non-defected pipe depth region and at least one pipe characterization depth region. The measured response to the non-defected pipe region can be employed to generate a filter that rejects the natural variations of the pipe. A metal loss function can then be generated for the pipe characterization depth region based on the filtered measured response corresponding to the pipe characterization depth region.

The length of the downhole pipe can further be divided to include a known pipe feature depth region, which may include, for example, collars. An impulse response function can be generated based on the measured response to the known pipe feature region, which can also be used for generating the metal loss function for the pipe characterization depth region. Using the metal loss function, a visualization of the corrosion of one or more pipes may be generated. Further, based on the metal loss function at least one downhole operational parameter can be adjusted. The operational parameter may be a drilling parameter, a logging parameter, a completion parameter, a production parameter, and any combination thereof.

FIG. 1 illustrates a diagrammatic view of a wellbore operating environment 100 in which an apparatus, method, and system, having an electromagnetic (EM) logging tool 110, may be deployed in accordance with certain exemplary embodiments of the present disclosure. The wellbore operating environment 100 includes a drilling platform 165 equipped with a derrick that supports a hoist 168. Drilling oil and gas wells is commonly carried out using a string of drill pipes connected together so as to form a drilling string that is lowered through a rotary table 172 into a wellbore 120. During drilling operations, casing is installed in the drilled wellbore by cementing a string of metal pipes connected end-to-end within the wellbore. As depicted in FIG. 1, wellbore 120 comprises multiple concentric casing strings 130, 132, 134 secured in the wellbore. Each casing string has a smaller diameter, with the outer casing string 130 having the largest diameter, the intermediate casing string 132 having the next largest diameter, and the inner casing string 134 having the smallest diameter. As depicted in FIG. 1, the inner casing string 134 forms the wall of wellbore 120. In at least some instances, the inner casing string 134 may be a production casing or production tubing through which hydrocarbons from produced formations may be received at the surface 195, as shown in detail in FIG. 2.

Figure 2:
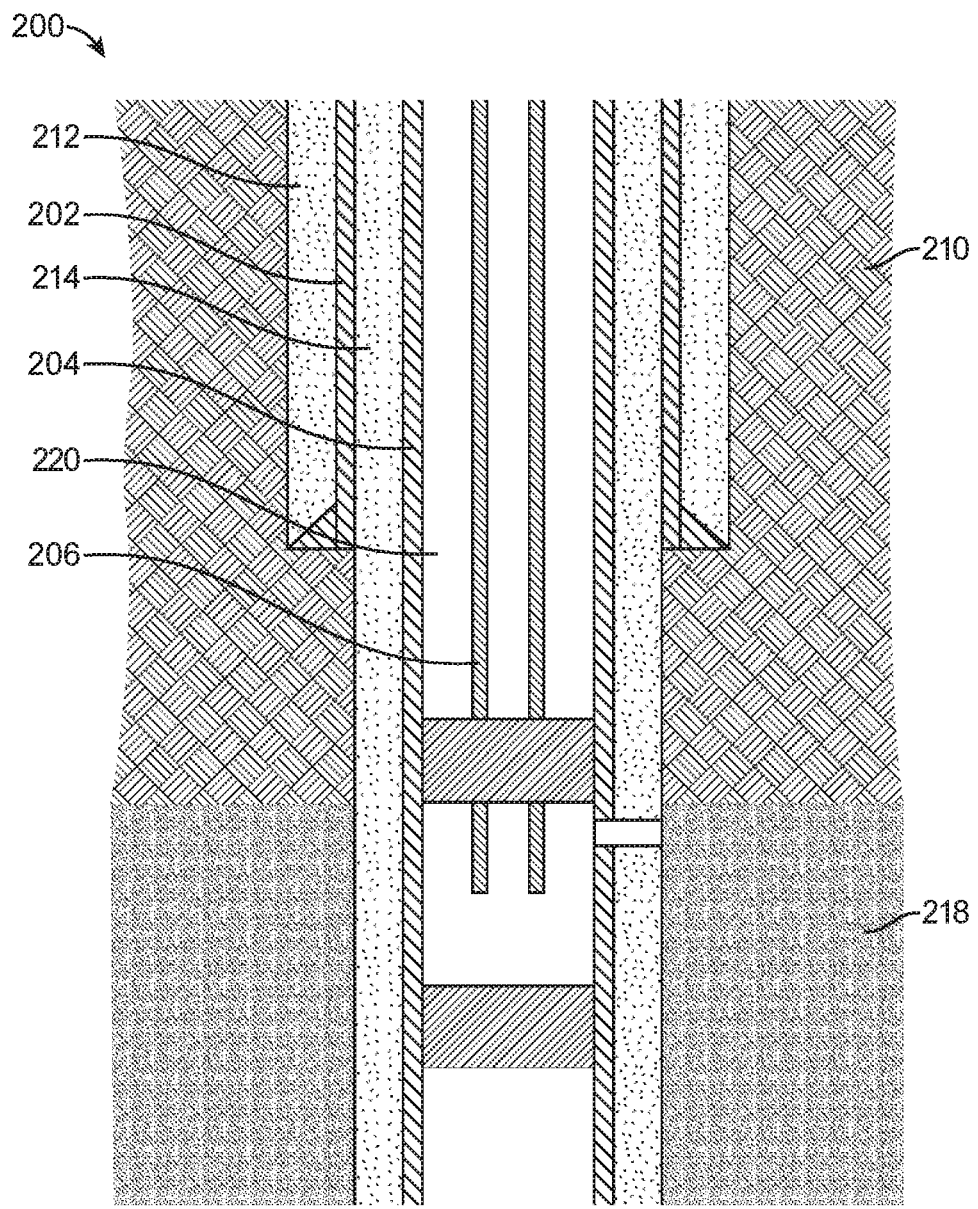
FIG. 2 is a diagram of a production environment having multiple concentric casings in which an apparatus, method, and system, having an EM logging tool, may be deployed, according to an exemplary embodiment.

FIG. 2 illustrates a diagrammatic view of a production environment 200 having multiple concentric casings in which an apparatus, method, and system, having an EM logging tool, may be deployed, in accordance with exemplary embodiments of the present disclosure. The production environment 200 includes concentric casing strings 202, 204 disposed within wellbore 220 that has been drilled through rock formations 210, 218. Outer casing string 202 is secured within wellbore 220 through cement layer 212. Inner casing string 204 is secured within wellbore 220 and outer casing string 202 through cement layer 214. As depicted in FIG. 2, the production environment 200 further includes production tubing 206 through which hydrocarbons from produced formation 218 may flow to the surface. Therefore, inner casing string 204 may serve as a production casing.

Referring back to FIG. 1, some or all of the drill string has been removed from the wellbore 120 to allow an electromagnetic (EM) logging tool 110 to be lowered into the wellbore 120. The electromagnetic (EM) logging tool 110 may be conveyed in the wellbore 120 by any conveyance 140 including, but not limited to, wireline, logging cable, slickline, tubing, coiled tubing, pipe, metallic wire, non-metallic wire, or composite wire. Although not depicted as such, in one or more embodiments, the EM logging tool 110 may be part of a bottom hole assembly (BHA) of a logging while drilling tool. Typically, the EM logging tool 110 is lowered into the wellbore 120 and subsequently used to perform operations adjacent to one or more pipes or pipe features of interest, such as pipes comprising casing strings 130, 132, 134.

As depicted in FIG. 1, the EM logging tool 110 may include one or more transmitter coils and receiver coils, as well as data acquisition electronics, to implement the response measurements described herein. The EM logging tool 110 may additionally include one or more additional logging tools for casing evaluation or formation evaluation. The EM logging tool 110 may be communicatively coupled with a control or processing facility 160 at the surface 195. While the control or processing facility 160 is depicted in FIG. 1 as a truck, the control or processing facility 160 may be any structure without departing form the spirit and scope of the present disclosure. In at least some instances, the EM logging tool 110 may also receive power from the control or processing facility 160. In other cases, the EM logging tool 110 receives power from a downhole power source, such as a battery.

The control or processing facility 160 may include at least one computer system 175 communicatively coupled with the EM logging tool 110. The computer system 175 may be capable of sending and receiving control signals and/or telemetry data to and from the EM logging tool 110. The computer system 175 may be further capable of obtaining the measured responses from the EM logging tool 110 and implementing the methods described herein. The control or processing facility 160 and/or the computer system 175 may be located at the surface 195 adjacent to the wellbore 120, as depicted in FIG. 1, or may be located at a remote location. In at least some instances, the methods described herein may be implemented on a computer system 175 not communicatively coupled with the EM logging tool, without departing from the spirit and scope of the present disclosure, as long as the computer system is capable of obtaining the measured responses acquired by the EM logging tool 110.

In at least some instances, EM logging tool 110 may include at least one downhole computing device 150. In such instances, the downhole computing device 150 is in communication with the control or processing facility 160 and/or the computer system 175 via one or more communication lines. The communication lines may be any wired or wireless means of telecommunication between two locations and may include, but is not limited to, electrical lines, fiber optic lines, radio frequency transmission, electromagnetic telemetry, and acoustic telemetry. In at least some instances, downhole computing device 150 is capable of implementing the methods described herein.

Modifications, additions, or omissions may be made to FIG. 1 without departing from the spirit and scope of the present disclosure. For example, FIG. 1 depicts components of the wellbore operating environment 100 in a particular configuration. However, any suitable configuration of components for EM logging a wellbore may be used. Furthermore, fewer components or additional components beyond those illustrated may be included in the wellbore operating environment 100 without departing from the spirit and scope of the present disclosure.

Figure 3A:
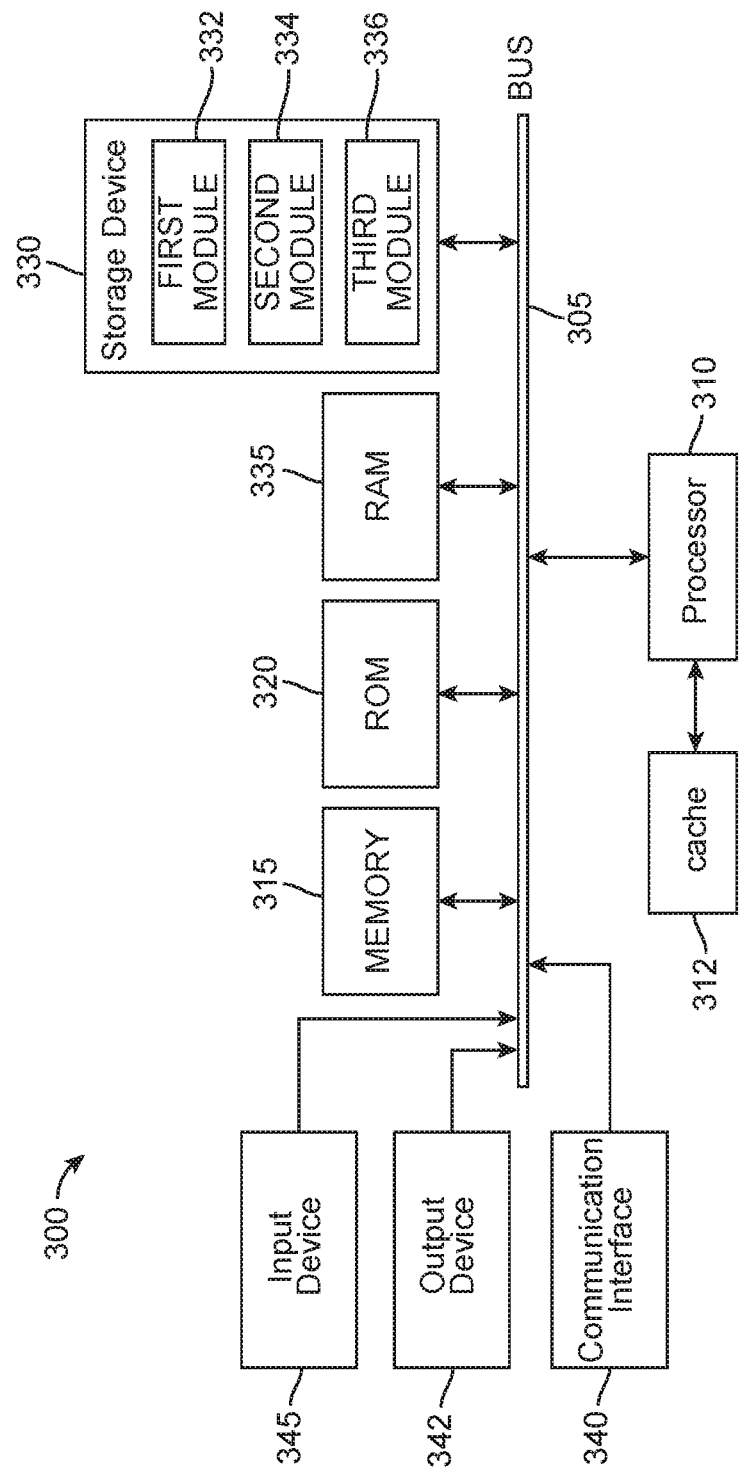
FIG. 3A is an illustration depicting a conventional system bus computing system architecture, according to an exemplary embodiment.
Figure 3B:
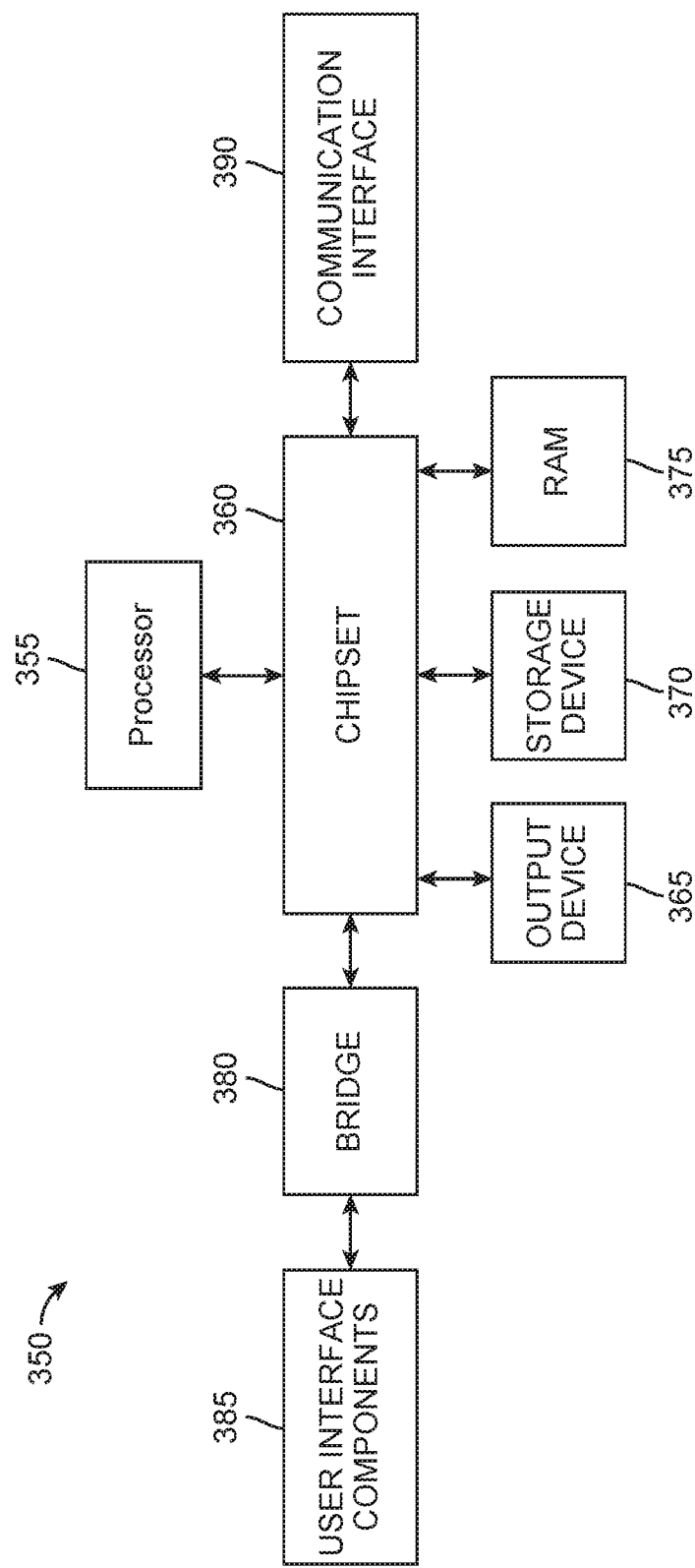
FIG. 3B is an illustration depicting a computer system having a chipset architecture, according to an exemplary embodiment.

Computer system 175 and downhole computing device 150 may include any suitable computer, controller, or data processing apparatus capable of being programmed to carry out the method, system, and apparatus as further described herein. FIGS. 3A and 3B illustrate exemplary computer system 175 and computing device 150 embodiments which can be employed to practice the concepts, methods, and techniques disclosed herein. The more appropriate embodiment will be apparent to those of ordinary skill in the art when practicing the present technology. Persons of ordinary skill in the art will also readily appreciate that other system embodiments are possible.

FIG. 3A illustrates a conventional system bus computing system architecture 300 wherein the components of the system are in electrical communication with each other using a bus 305. System 300 can include a processing unit (CPU or processor) 310 and a system bus 305 that couples various system components including the system memory 315, such as read only memory (ROM) 320 and random access memory (RAM) 335, to the processor 310. The system 300 can include a cache of high-speed memory connected directly with, in close proximity to, or integrated as part of the processor 310. The system 300 can copy data from the memory 315 and/or the storage device 330 to the cache 312 for quick access by the processor 310. In this way, the cache 312 can provide a performance boost that avoids processor 310 delays while waiting for data. These and other modules can control or be configured to control the processor 310 to perform various actions. Other system memory 315 may be available for use as well. The memory 315 can include multiple different types of memory with different performance characteristics. It can be appreciated that the disclosure may operate on a computing device 300 with more than one processor 310 or on a group or cluster of computing devices networked together to provide greater processing capability. The processor 310 can include any general purpose processor and a hardware module or software module, such as first module 332, second module 334, and third module 336 stored in storage device 330, configured to control the processor 310 as well as a special-purpose processor where software instructions are incorporated into the actual processor design. The processor 310 may essentially be a completely self-contained computing system, containing multiple cores or processors, a bus, memory controller, cache, etc. A multi-core processor may be symmetric or asymmetric.

The system bus 305 may be any of several types of bus structures including a memory bus or a memory controller, a peripheral bus, and a local bus using any of a variety of bus architectures. A basic input/output (BIOS) stored in ROM 320 or the like, may provide the basic routine that helps to transfer information between elements within the computing device 300, such as during start-up. The computing device 300 further includes storage devices 330 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 330 can include software modules 332, 334, 336 for controlling the processor 310. The system 300 can include other hardware or software modules. The storage device 330 is connected to the system bus 305 by a drive interface. The drives and the associated computer-readable storage devices provide non-volatile storage of computer-readable instructions, data structures, program modules and other data for the computing device 300. In one aspect, a hardware module that performs a particular function includes the software components shorted in a tangible computer-readable storage device in connection with the necessary hardware components, such as the processor 310, bus 305, and so forth, to carry out a particular function. In the alternative, the system can use a processor and computer-readable storage device to store instructions which, when executed by the processor, cause the processor to perform operations, a method or other specific actions. The basic components and appropriate variations can be modified depending on the type of device, such as whether the device 300 is a small, handheld computing device, a desktop computer, or a computer server. When the processor 310 executes instructions to perform "operations", the processor 310 can perform the operations directly and/or facilitate, direct, or cooperate with another device or component to perform the operations.

To enable user interaction with the computing device 300, an input device 345 can represent any number of input mechanisms, such as a microphone for speech, a touch-sensitive screen for gesture or graphical input, keyboard, mouse, motion input, speech and so forth. An output device 342 can also be one or more of a number of output mechanisms known to those of skill in the art. In some instances, multimodal systems can enable a user to provide multiple types of input to communicate with the computing device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks (DVDs), cartridges, RAMs 325, ROM 320, a cable containing a bit stream, and hybrids thereof.

The logical operations for carrying out the disclosure herein may include: (1) a sequence of computer implemented steps, operations, or procedures running on a programmable circuit with a general use computer, (2) a sequence of computer implemented steps, operations, or procedures running on a specific-use programmable circuit; and/or (3) interconnected machine modules or program engines within the programmable circuits. The system 300 shown in FIG. 3A can practice all or part of the recited methods, can be a part of the recited systems, and/or can operate according to instructions in the recited tangible computer-readable storage devices.

One or more parts of the example computing device 300, up to and including the entire computing device 300, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 310 can include all types of processors disclosed herein, including a virtual processor. However, when referring to a virtual processor, the processor 310 includes the software components associated with executing the virtual processor in a virtualization layer and underlying hardware necessary to execute the virtualization layer. The system 300 can include a physical or virtual processor 310 that receives instructions stored in a computer-readable storage device, which causes the processor 310 to perform certain operations. When referring to a virtual processor 310, the system also includes the underlying physical hardware executing the virtual processor 310.

FIG. 3B illustrates an example computer system 350 having a chipset architecture that can be used in executing the described method and generating and displaying a graphical user interface (GUI). Computer system 350 can be computer hardware, software, and firmware that can be used to implement the disclosed technology. System 350 can include a processor 355, representative of any number of physically and/or logically distinct resources capable of executing software, firmware, and hardware configured to perform identified computations. Processor 355 can communicate with a chipset 360 that can control input to and output from processor 355. Chipset 360 can output information to output device 365, such as a display, and can read and write information to storage device 370, which can include magnetic media, and solid state media. Chipset 360 can also read data from and write data to RAM 375. A bridge 380 for interfacing with a variety of user interface components 385 can include a keyboard, a microphone, touch detection and processing circuitry, a pointing device, such as a mouse, and so on. In general, inputs to system 350 can come from any of a variety of sources, machine generated and/or human generated.

Chipset 360 can also interface with one or more communication interfaces 390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 355 analyzing data stored in storage 370 or RAM 375. Further, the machine can receive inputs from a user via user interface components 385 and execute appropriate functions, such as browsing functions by interpreting these inputs using processor 355.

It can be appreciated that systems 300 and 350 can have more than one processor 310, 355 or be part of a group or cluster of computing devices networked together to provide processing capability. For example, the processor 310, 355 can include multiple processors, such as a system having multiple, physically separate processors in different sockets, or a system having multiple processor cores on a single physical chip. Similarly, the processor 310 can include multiple distributed processors located in multiple separate computing devices, but working together such as via a communications network. Multiple processors or processor cores can share resources such as memory 315 or the cache 312, or can operate using independent resources. The processor 310 can include one or more of a state machine, an application specific integrated circuit (ASIC), or a programmable gate array (PGA) including a field PGA.

Methods according to the aforementioned description can be implemented using computer-executable instructions that are stored or otherwise available from computer readable media. Such instructions can comprise instructions and data which cause or otherwise configured a general purpose computer, special purpose computer, or special purpose processing device to perform a certain function or group of functions. portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software. The functions these blocks represent may be provided through the use of either shared or dedicated hardware, including, but not limited to, hardware capable of executing software and hardware, such as a processor 310, that is purpose-built to operate as an equivalent to software executing on a general purpose processor. For example, the functions of one or more processors represented in FIG. 3A may be provided by a single shared processor or multiple processors. (use of the term "processor" should not be construed to refer exclusively to hardware capable of executing software.) Illustrative embodiments may include microprocessor and/or digital signal processor (DSP) hardware, ROM 320 for storing software performing the operations described below, and RAM 335 for storing results. Very large scale integration (VLSI) hardware embodiments, as well as custom VLSI circuitry in combination with a general purpose DSP circuit, may also be provided.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in the present disclosure.

Figure 4:
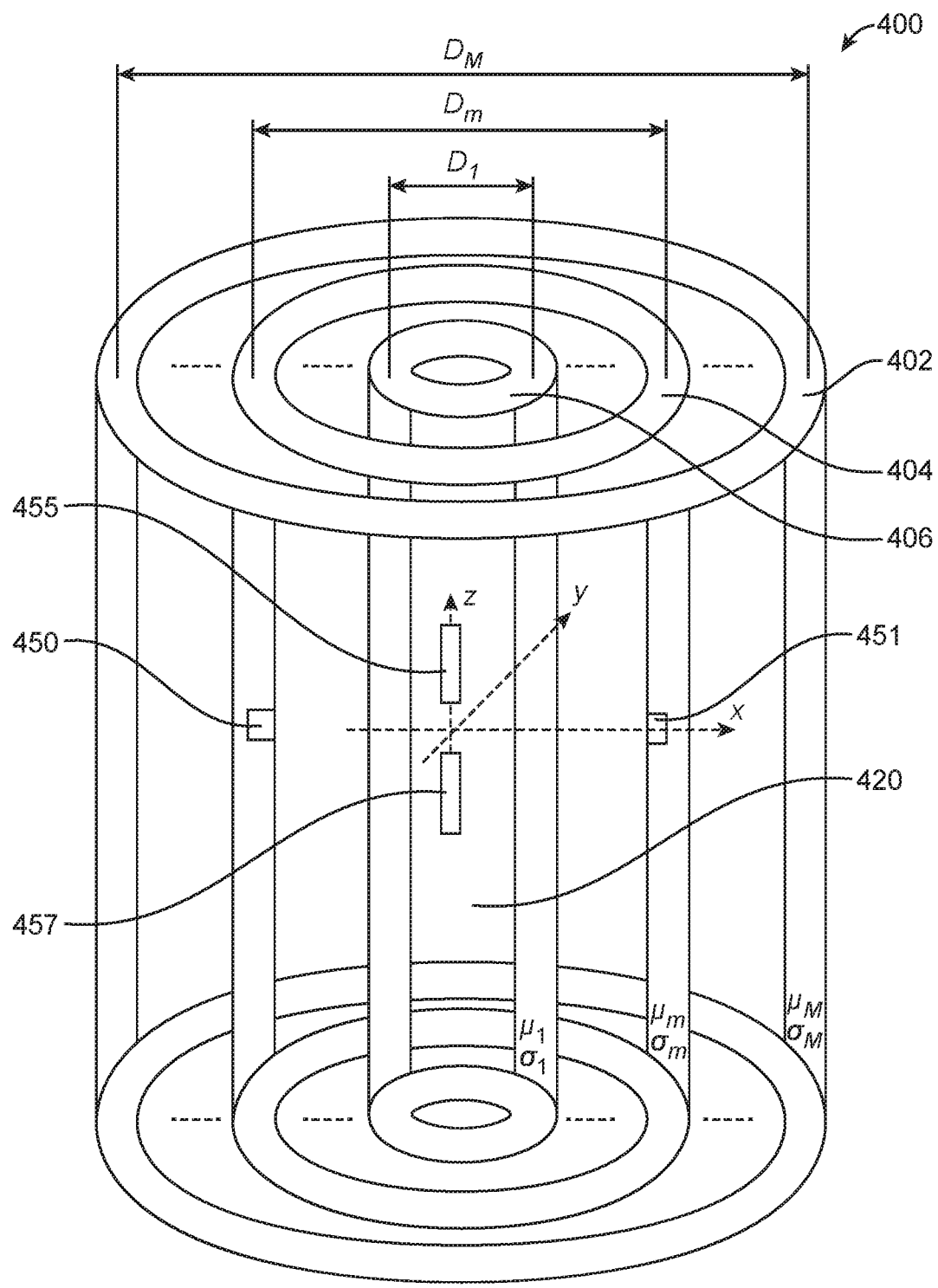
FIG. 4 is a diagram depicting a wellbore operating environment including a plurality of concentric downhole pipes having delta-like defects, according to an exemplary embodiment.

The presently disclosed method utilizes a holographic approach for characterizing downhole pipe corrosion including, for example, the corrosion of multiple concentric casing strings. FIG. 4 depicts a wellbore operating environment 400 that includes a plurality of concentric downhole pipes. The pipes may be any downhole pipe or concentrically arranged set of downhole pipes. For example, the plurality of concentric downhole pipes depicted in FIG. 4 may include an outer casing string, inner casing string, and production tubing within the inner casing string. However, for purposes of illustration, the plurality of downhole pipes will be referred to as outer casing string 402, intermediate casing string 404, and inner casing string 406, although one of ordinary skill in the art will understand that 402, 404, and 406 may refer to any concentric downhole pipe without departing from the spirit and scope of the present disclosure. Additionally, while FIG. 4 depicts three concentrically arranged downhole pipes, the present disclosure is equally well-suited to characterizing downhole pipe corrosion for any number of downhole pipes, including just a single downhole pipe. The present disclosure is also equally well-suited to characterizing downhole pipe corrosion in downhole pipes having any configuration or orientation including, but not limited to, production tubing, coiled tubing, collars, filters, packers, and perforations.

As depicted in FIG. 4, outer casing string 402 has a diameter, $D_M$, intermediate casing string 404 has a diameter, $D_m$, and inner casing string has a diameter, $D_1$. Each downhole pipe may also have a characteristic relative permeability, $\mu_m$, and a characteristic conductivity $\sigma_m$. The wellbore operating environment 400 includes wellbore 420 having walls formed by inner casing string 406.

As depicted in FIG. 4, disposed within wellbore 420 is transmitter coil 455 and receiver coil 457 that may be lowered into wellbore 420 as part of an EM logging tool, such as the EM logging tool 150 described with respect to FIG. 1. After the EM logging tool is lowered into the wellbore, the EM logging tool may emit EM energy from an EM energy source, such as transmitter coil 455. A plurality of measured responses of downhole pipes 402, 404, 406 may be obtained via EM logging tool as EM energy received at receiver coil 457. As shown in FIG. 4, the position of transmitter coil 455 and receiver coil 457 within wellbore 420 may be described using axes x, y, and z having their origins in the center of wellbore 420.

The holographic approach uses a linear measurement system based upon the Born approximation. In a linear measurement system, once a measured response corresponding to a small but measureable metal loss region is obtained, the measured response for any other investigated metal loss region can be computed. For example, if there is a small but measurable azimuthally symmetric metal loss in the m-th casing at z=0, for instance 450, 451 in FIG. 4, the metal loss can be approximated with a delta function, $\delta(z, D_m/2)$, at a radial distance of $D_m/2$, where $D_m$ is the diameter of the m-th casing, z is the axial position and $D_m/2$ is the radial position. Such a defect 450, 451 may be termed a delta-like defect and the measured response of a delta-like defect measured by an EM logging tool over the z axis at a single frequency, ω, may be termed a delta-like defect response and is denoted by $h(z, D_m/2, \omega)$.

The delta-like defect response $h(z, D_m/2, \omega)$ can be calibrated such that it includes the response due to the metal loss only and not due to the downhole pipes, such as downhole tubing or casing strings. This calibration may be performed by measuring the response over the z axis twice, once with the presence of the metal loss and once without. The two responses may then be subtracted. For example, the calibrated response, r, due to any arbitrary metal loss function $x(z, D_m/2)$ in the m-th casing, for example, arbitrary defects 550, 551 shown in FIG. 5, can be expressed in terms of the delta-like defect response $h(z, D_m/2, \omega)$ as:

$$r(z,D_m/2,\omega) \approx x(z,D_m/2)*h(z,D_m/2,\omega) \qquad \text{Eqn. 1}$$

where * denotes the convolution operation along the z direction and ω denotes the operation frequency. By taking the Fourier transform of both sides with respect to the z variable, the following equation may be obtained:

$$R(k_z,D_m/2,\omega) \approx X(k_z,D_m/2)H(k_z,D_m/2,\omega) \qquad \text{Eqn. 2}$$

where R, X, and H are obtained from the r, x, and h functions, respectively, and when taking the Fourier transform with respect to the variable z, $k_z$ is the Fourier variable corresponding to the z variable. According to Eqn. 2, the metal loss function x can be determined from the calibrated response h due to a delta-like defect in the m-th casing, which can be determined beforehand, and a measured response r due to an arbitrary metal loss function x in the same casing.

Figure 5:
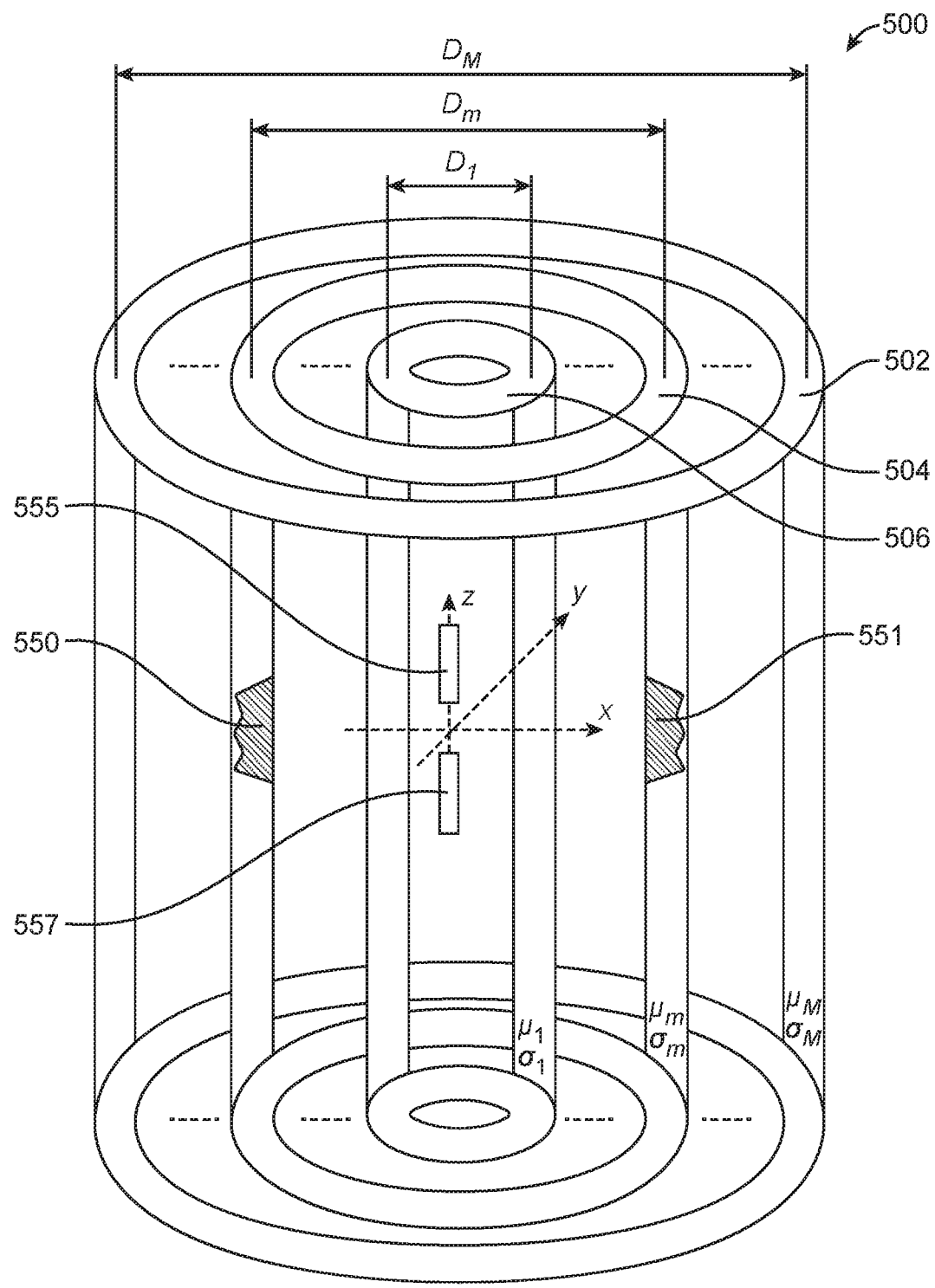
FIG. 5 is a diagram depicting a wellbore operating environment including a plurality of concentric downhole pipes having arbitrary defects, according to an exemplary embodiment.

Eqn. 2 can be used to characterize the corrosion of a single downhole pipe, for example, the arbitrary defects 550, 551 of intermediate casing string 504 shown in FIG. 5 may be characterized using measured responses obtained by transmitter coil 555 and receiver coil 557. However, the technique can be extended to evaluate corrosion on multiple casings, such as inner casing 506 and outer casing 502, by approximating the calibrated response using the superposition principle. For instance, the calibrated response can be determined from the sum of the individual responses due to the corrosion on each casing. Thus, for metal loss variations for casing 1 to M, Eqn. 2 may be expressed as:

$$R(k_z,\omega) \approx X(k_z,D_1/2)H(k_z,D_1/2,\omega) + \ldots + X(k_z,D_m/2)H(k_z,D_m/2,\omega). \qquad \text{Eqn. 3}$$

Writing Eqn. 3 at N frequencies results in:

$$\bar{R} \approx \bar{\bar{H}} \bar{X} \qquad \text{Eqn. 4}$$

where, $$\bar{R} = \begin{bmatrix} R(k_z, \omega_1) \\ \vdots \\ R(k_z, \omega_N) \end{bmatrix}, \qquad \text{Eqn. 5}$$

$$\bar{\bar{H}} = \begin{bmatrix} H(k_z, D_1/2, \omega_1) & \cdots & H(k_z, D_M/2, \omega_1) \\ \vdots & \ddots & \vdots \\ H(k_z, D_1/2, \omega_N) & \cdots & H(k_z, D_M/2, \omega_N) \end{bmatrix}, \text{ and} \qquad \text{Eqn. 6}$$

$$\bar{X} = \begin{bmatrix} X(k_z, D_1/2) \\ \vdots \\ X(k_z, D_M/2) \end{bmatrix}. \qquad \text{Eqn. 7}$$

This system of equations can be solved for $\bar{X}$ in the least square sense. Once the systems of equations are solved for all $k_z$ values, the reconstruction of the defects of the casings $x(z, D_m/2)$, m=1, . . . , M are determined by taking the inverse Fourier transform of $X(k_z, D_m/2)$, m=1, . . . , M with respect to the $k_z$ variable.

In the holographic characterization approach presented above, it is assumed that the calibrated delta-like defect response is known a priori. The calibrated delta-like defect response can be determined beforehand by measuring delta-like metal loss regions or small defects for various number of downhole pipes, such as casings, having variable permeability, thickness, and outer diameters. Alternatively, the calibrated delta-like defect response can be obtained from forward modelling simulations. However, whether the calibrated delta-like defect response is determined by prior measurements or forward modeling simulations, an extensive number of measurements or simulations must be run to provide such information. Additionally, obtaining delta-like defect responses that precisely corresponds to dimensions and electrical properties of downhole pipes to be monitored is challenging.

Figure 6:
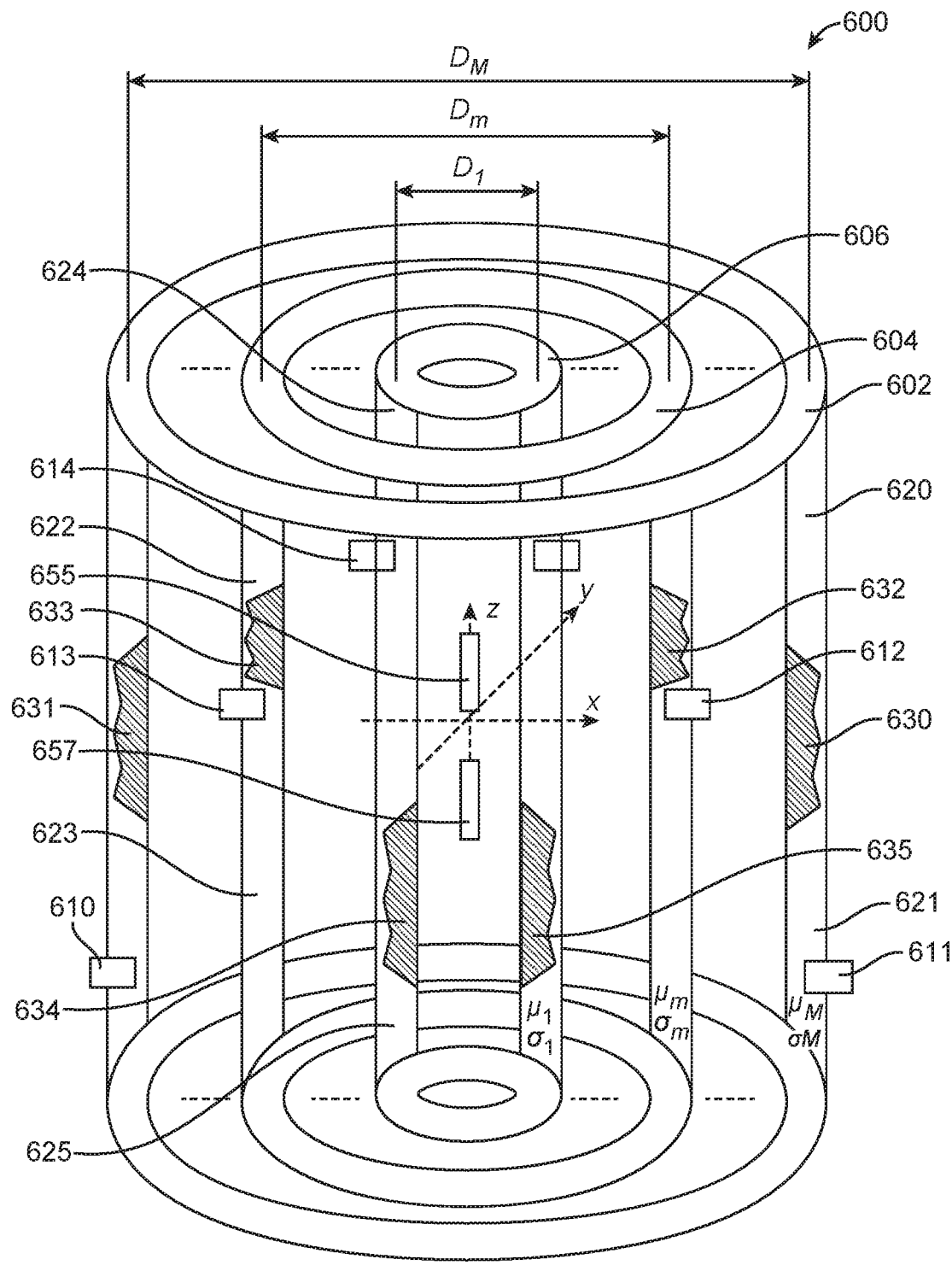
FIG. 6 is a diagram depicting a wellbore operating environment including a plurality of concentric downhole pipes having known pipe feature regions, non-defected pipe regions, and arbitrary defects, according to an exemplary embodiment.

According to the present disclosure, a method, apparatus, and system are provided that may determine delta-like defect responses directly from EM logging tool measurements of a particular downhole pipe. Therefore, the provided method eliminates the requirement of constructing large databases of delta-like defect responses prior to characterizing downhole pipe corrosion using EM logging tools. In contrast, the presently disclosed method uses known pipe features, such as the collars on a casing string, to directly determine delta-like defect responses for one or more downhole pipes. For example, FIG. 6 depicts a wellbore operating environment 600 that includes a plurality of concentric downhole pipes 602, 604, 606. Each downhole pipe includes depth regions corresponding to known pipe features, non-defected pipe depth regions, and pipe characterization regions. For instance, outer casing string 602 includes known pipe features 610, 611 corresponding to casing string collars. Outer casing string 602 also includes non-defected pipe depth regions 620, 621 as well as pipe characterization depth regions 630, 631. While pipe characterization depth regions are depicted in FIG. 6 as corresponding to corrosion defects, pipe characterization regions may correspond to any depth region along a downhole pipe that is being characterized. Similarly, intermediate casing string 604 includes known pipe features 612, 613, non-defected pipe depth regions 622, 623, and pipe characterization depth regions 632, 633. Inner casing string 606 includes known pipe features 614, 615, non-defected pipe depth regions 624, 625, and pipe characterization depth regions 634, 635.

As used here, the term "known pipe feature" is used to refer to any feature of a downhole pipe having a known shape and/or size as well as known material properties. While FIG. 6 depicts known pipe features 610-615 as casing string collars, known pipe features 610-615 may be any known pipe feature including, but not limited to, collars, casing collars, pipe couplings, sleeves, clamps, joints, fittings and perforations.

Assuming that the response due to a known pipe feature is measured for the m-th casing at a region that is not affected by the known pipe features of other downhole pipes, the linear relation based on the Born approximation may be used to approximate the measured response due to the known pipe feature, $r_c(z, D_m/2, \omega)$ according to:

$$r_c(z, D_m/2, \omega) \approx x_c(z, D_m/2) * h(z, D_m/2, \omega),\qquad \text{Eqn. 8}$$

where $x_c(z, D_m/2)$ is the change in the shape of the pipe due to the existence of the known pipe feature and $h(z, D_m/2, \omega)$ is the delta-like defect response for the m-th pipe. According to Eqn. 8, by measuring the known pipe feature response from the m-th pipe $r_c(z, D_m/2, \omega)$ and knowing the shape change for that pipe due to the existence of the known pipe feature $x_c(z, D_m/2)$, the delta-like defect response for the m-th pipe $h(z, D_m/2, \omega)$ can be estimated. More specifically, the delta-like defect response for the m-th pipe $h(z, D_m/2, \omega)$ can be estimated by taking the Fourier transform of Eqn. 8 with respect to the z variable to obtain $$R_c(k_z, D_m/2, \omega) \approx X_c(k_z, D_m/2) H(k_z, D_m/2, \omega).\qquad \text{Eqn. 9}$$

Then, $H(k_z, D_m/2, \omega)$ can be computed according to $$H(k_z, D_m/2, \omega) \approx \frac{R_c(k_z, D_m/2, \omega)}{X_c(k_z, D_m/2)}.\qquad \text{Eqn. 10}$$

From equation 10, $h(z, D_m/2, \omega)$ can be obtained by taking the inverse Fourier transform of $H(k_z, D_m/2, \omega)$ with respect to the $k_z$ variable. If the known pipe feature is repeated along the axial direction of the downhole pipes, as is true for casing collars, the processing to obtain the delta-like defect responses can be repeated for several collars to ensure the best estimate of the delta-like defect response. Additionally, estimation of the delta-like defect response can be performed for separate regions of the downhole pipe in cases in which one or more properties of the downhole pipe, such as permeability or conductivity, may vary along the axial length of the downhole pipe. Therefore, more than one delta-like defect response may be determined along the longitudinal length of the same downhole pipe in order to more accurately estimate corrosion defects along certain nearby lengths of the downhole pipe.

Accordingly, the impulse response function required to determine a metal loss function x for one or more downhole pipes may be obtained from the measured responses of known pipe features instead of using pre-known impulse response functions. A visualization of the corrosion of one or more downhole pipes may be generated based on the metal loss function. In at least some instances, more than one type of known pipe feature may be used in combination to determine a delta-like defect response for a particular downhole pipe. For example, one or more casing collars and one or more clamps may be used to obtain a more accurate delta-like defect response for a particular downhole pipe.

In at least some instances, the material properties of the known pipe feature may be different from the material properties of the downhole pipe. In such cases, the delta-like defect response for a downhole pipe may be determined using corrective coefficients to correct for any difference in material properties between the known pipe feature and that of the downhole pipe. Accordingly, the presently disclosed method may include applying a corrective coefficient to the measured response corresponding to the known pipe feature.

In a given downhole environment, there may be multiple delta-like objects and associated responses. Responses from each object will be somewhat different since the material properties and the geometry of the delta-like object may not be exactly the same. For example, the magnitude of the signal from the delta-like object may differ as a function of the permeability of the pipe the object is on. In at least some instances, the joint response of a certain pipe may be used in order to better characterize the delta-like object and remove any bias due to the selection of a certain object as opposed to others. In at least some instances, average responses from multiple downhole pipes may be used in order to better characterize the delta-like object and remove bias. In still other instances, average responses from the top and bottom of the same downhole pipe may be used to better characterize the delta-like object and remove bias.

During logging, only a particular depth interval for one or more downhole pipes may be characterized at a time. For example, at each depth, a window is defined centered at that depth and the inversion problem is solved. A separate depth range is defined for the solution. After the results at each depth are computed, they are combined together to obtain a single and compete 2D image along the depth.

In at least some instances, the solution of Eqn. 4 results in multiple solutions with similar fit due to the ill-posedness of the inversion problem. This result may be mitigated by forcing the solution to as small as a defect as possible. This regularizes the problem and prevents the solution from destructing. In addition, an additional constraint on rejecting natural pipe variations can be added. For example, a natural pipe variation spatial frequency spectrum can be obtained from pipes with no defects for all measurement channels, and the processing solution can be forced to use frequencies away from the natural pipe variations. This can result in better discrimination of defects and natural variations which is important especially for imaging of third and fourth pipes. A minimization function for the solution of Eqn. 4 can be:

$$F = |R - HX| + |RG| \qquad \text{Eqn. 11}$$

where G is a spatial filter which has lower values at frequencies other than the natural pipe variation frequency, and higher values at natural pipe variation frequencies. |C| is the $L_1$, $L_2$, or any other norm of vector C. Filter G can be selected to be a normalized version of the natural pipe variation spectrum.

Accordingly, a filter that rejects the natural variations of the downhole pipe may be designed using the measure responses corresponding to one or more non-defected depth regions, such as non-defected depth regions 620-625 depicted in FIG. 6. The filter may then be applied to the measured responses corresponding to downhole pipe characterization depth regions, such as pipe characterization depth regions 630-635 in FIG. 6, to remove the natural variations of the pipe. A metal loss function for the pipe characterization depth region may then be generated based on the filtered measured response corresponding to the pipe characterization depth region. Further, an inversion on the filtered measured response may be performed in order to determine a metal loss function for pipe characterization depth regions corresponding to a plurality of downhole pipes. Additionally, a reconstructed measured response may be generated from the filtered measured response by interpolating or extrapolating the filtered measured response using the frequencies that are neighboring the frequencies at which filtering is applied. In order to achieve this a first frequency cut-off that bounds majority of the natural variation signal energy from below is selected. For example, first frequency cut-off may be selected as the frequency where only 5 percent of the natural variation signal energy is below the first frequency cut-off. Next, similarly, a second frequency cut-off that bounds majority of the natural variation signal energy from above is selected. For example, second frequency cut-off may be selected as the frequency where only 5 percent of the natural variation signal energy is above the second frequency cut-off. Next, any frequency domain complex value between the first and second frequencies may be interpolated using linear or spline curve fitting on the real and imaginary parts of the complex value. This process can be applied to any subset of measurements.

The thicknesses of a plurality of downhole pipes may be calculated using the metal loss function, x, and a visualization of the thickness of one or more downhole pipes may be generated. Based on the metal loss function, x, or on the visualization of the corrosion of one or more downhole pipes, at least one downhole operational parameter may be adjusted. The adjusted operational parameter may include, but is not limited to, a drilling parameter, a logging parameter, a completion parameter, a production parameter, and any combination thereof.

The metal loss function, x, determined according to the presently disclosed methods, is an approximate evaluation of the extent of a downhole defect. Since the presently disclosed approach is based on the Born approximation, the methods are most accurate when the defects are relatively small. Additionally, the accuracy and resolution of the presently disclosed methods depends on the measurement of the delta-like defect response. The defect for which the delta-like defect response is measured, represents the smallest defect that can be imaged by the system. In other words, it determines the size of each pixel in the image. Any larger defect can be then imaged with similar pixel size.

In the present disclosure, the variation of the delta-like defect response with the radial distance over the thickness of the casing string can also be addressed. In at least some instances, the delta-like defect response can be measured over the radial distance within the casing and this variation can be included in the image reconstruction process.

According to at least one aspect of the present disclosure, the presently disclosed method, apparatus, and system provides for monitoring the condition of downhole pipes with improved resolution and defect evaluation. For example, small dimensional metal loss features and flaws may be resolved with better accuracy using the presently disclosed method as compared with conventional monitoring techniques and tools. Additionally, the presently disclosed method minimizes the amount of pre-known data required for processing measured responses to determine metal loss by computing delta-like defect responses directly from the measured signals instead of using a pre-constructing library. The presently disclosed method has the additional advantage that electrical property values for downhole pipes do not need to be estimated. Accordingly, the presently disclosed method, apparatus, and system provides for improved characterization of downhole pipes resulting in a more precise evaluation of downhole metallic components that may positively impact the production process.

According to at least one aspect of the present disclosure, a method is provided. The method includes obtaining a plurality of measured responses of a downhole pipe to an EM field using an electromagnetic (EM) logging tool, where the downhole pipe has at least one non-defected pipe depth region and at least one pipe characterization depth region. The method may further include designing a filter that rejects the natural variations of the pipe using the measured response corresponding to the non-defected depth region. The method may also include applying the filter to the measured response corresponding to the pipe characterization depth region to remove the natural variations of the pipe. The method can further include generating a metal loss function for the pipe characterization depth region based on the filtered measured response corresponding to the pipe characterization depth region.

According to at least one aspect of the present disclosure, the downhole pipe can further include a known pipe feature depth region. In such instances, the method can further include generating an impulse response function based on the measured response corresponding to the known pipe feature. The method may also include generating a metal loss function for the pipe characterization depth region based at least in part on the filtered measured response corresponding to the pipe characterization depth region and the impulse response function.

According to at least one aspect of the present disclosure, the method can further include generating a reconstructed measured response from the filtered measured response by interpolating or extrapolating the filtered measured response using the frequencies that are neighboring the frequencies at which filtering is applied. In a further aspect, the method may further include lowering an electromagnetic (EM) logging tool in a wellbore and obtaining, via the EM logging tool, a plurality of measured responses of a downhole pipe to an EM field. The EM logging tool may emit EM energy from an EM energy source or transmitter coil and receive EM energy at a receiver coil. In a further aspect, the method may further include generating a visualization of the corrosion of one or more pipes based on the metal loss function.

In another aspect, the method can further include adjusting at least one downhole operational parameter based at least in part on the metal loss function. The operational parameter may be a drilling parameter, a logging parameter, a completion parameter, a production parameter, and any combination thereof.

According to at least one aspect of the present disclosure, the method may further include using the EM logging tool to obtain a plurality of measured responses from each of a plurality of downhole pipes to an EM field. In a further aspect, the method may further include performing an inversion on the filtered measured response to determine a metal loss function for pipe characterization depth regions corresponding to a plurality of downhole pipes. In a further aspect, the method may include calculating the thicknesses of a plurality of pipes using the metal loss function. In a further aspect, the method may also include generating a visualization of the thickness of one or more pipes based on the metal loss function.

According to at least one aspect of the present disclosure, a system is provided. The system may include an EM logging tool disposed within a wellbore containing one or more pipes. The system may further include at least one processor in communication with the EM logging tool. The processor may be coupled with at least one memory element containing a set of instructions that when executed by the processor causes the processor to: divide measured responses collected by the EM logging tool into at least two depth regions. The two depth regions may include at least one depth region corresponding to a non-defected region and at least one depth region corresponding to a pipe characterization region. The memory element may also contain instructions that when executed by the processor causes the processor to design a filter that rejects the natural variations of one or more pipes using the measured responses from the depth region corresponding to a non-defected region. The memory element may also contain instructions that when executed by the processor causes the processor to apply the filter to the measured response corresponding to the pipe characterization depth region to remove the natural variations of the pipe. The memory element may also contain instructions that when executed by the processor causes the processor to determine a metal loss function for the at least one depth region corresponding to a pipe characterization region, based at least in part on the corresponding measured response and the filter.

In a further aspect, the system may further include a memory element that also contains instructions that when executed by the processor causes the processor to further divide the measured responses into at least one depth region corresponding to a known pipe feature region. The memory element may also contain instructions that when executed by the processor causes the processor to generate an impulse response function using the measured response corresponding to the known pipe feature region and generate a metal loss function for the depth region corresponding to a pipe characterization region, based at least in part on the corresponding measured response, the impulse response function, and the filter.

In a further aspect, the system may further include a memory element that also contains instructions that when executed by the processor causes the processor to generate a reconstructed measured response from the filtered measured response by interpolating or extrapolating the filtered measured response using frequencies that are neighboring the frequencies at which filtering is applied. In a further aspect, the system may further include a memory element that also contains instructions that when executed by the processor causes the processor to perform an inversion on the filtered measured response to determine a metal loss function for pipe characterization regions corresponding to a plurality of pipes in the wellbore. In a further aspect, the system may further include a memory element that also contains instructions that when executed by the processor causes the processor to calculate a thickness of a plurality of pipes using the metal loss function.

According to at least one aspect of the present disclosure, an apparatus is provided. The apparatus may include an EM logging tool capable of obtaining EM log data that includes a plurality of measured responses. The apparatus may further include at least one processor in communication with the EM logging tool. The processor may be coupled with a non-transitory computer-readable storage medium having stored therein instructions which, when executed by the at least one processor, causes the at least one processor to: divide measured responses collected by the EM logging tool into at least two depth regions. The two depth regions may include at least one depth region corresponding to a non-defected region and at least one depth region corresponding to a pipe characterization region. The non-transitory computer-readable storage medium may have stored instructions which, when executed by the processor, cause the processor to design a filter that optimally rejects the natural variations of one or more pipes using the measured responses in the at least one depth region corresponding to a non-defected region, apply the filter to remove natural variations in the measured response corresponding to the pipe characterization region, and determine a metal loss function for the depth region corresponding to a pipe characterization region, based at least in part on the corresponding measured response and the filter.

In a further aspect, the apparatus may also include a non-transitory computer-readable storage medium that further contains a set of instructions that when executed by the processor further causes the processor to further divide the measured responses into at least one depth region corresponding to a known pipe feature, determine an impulse response function using the measured response corresponding to the known pipe feature, and determine a metal loss function for the depth region corresponding to a pipe characterization region, based at least in part on the corresponding measured response, the impulse response function, and the filter.

In a further aspect, the apparatus may also include a non-transitory computer-readable storage medium that further contains a set of instructions that when executed by the processor further causes the processor to generate a reconstructed measured response from the filtered measured response by interpolating or extrapolating the filtered measured response using the frequencies that are neighboring the frequencies at which filtering is applied.

In a further aspect, the apparatus may also include a non-transitory computer-readable storage medium that further contains a set of instructions that when executed by the processor further causes the processor to perform an inversion on the filtered measured response to determine a metal loss function for pipe characterization regions corresponding to a plurality of pipes in the wellbore. In a further aspect, the apparatus may also include a non-transitory computer-readable storage medium that further contains a set of instructions that when executed by the processor further causes the processor to calculate a thickness of a plurality of pipes using the metal loss function.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that a system including either one member of the set, or multiple members of the set, or all members of the set, satisfies the claim.

Statements of the Disclosure Include:

Statement 1: A method comprising: obtaining, using an electromagnetic (EM) logging tool, a plurality of measured responses of a downhole pipe to an EM field, the downhole pipe having a non-defected pipe depth region and a pipe characterization depth region; designing a filter that rejects the natural variations of the pipe using the measured response corresponding to the non-defected depth region; applying the filter to the measured response corresponding to the pipe characterization depth region to remove the natural variations of the pipe; and generating a metal loss function for the pipe characterization depth region based on the filtered measured response corresponding to the pipe characterization depth region.

Statement 2: A method according to Statement 1, wherein the downhole pipe further comprises a known pipe feature depth region, the method further comprising: generating an impulse response function based on the measured response corresponding to the known pipe feature; and generating a metal loss function for the pipe characterization depth region based at least in part on the filtered measured response corresponding to the pipe characterization depth region and the impulse response function.

Statement 3: A method according to Statement 2, further comprising generating a reconstructed measured response from the filtered measured response by interpolating or extrapolating the filtered measured response using the frequencies that are neighboring the frequencies at which filtering is applied.

Statement 4: A method according to any one of the preceding Statements 1-3, further comprising: generating a visualization of the corrosion of one or more pipes based on the metal loss function.

Statement 5: A method according to any one of the preceding Statements 1-4, further comprising: adjusting at least one downhole operational parameter based at least in part on the metal loss function.

Statement 6: A method according to Statement 5, wherein the operational parameter is selected from the group consisting of a drilling parameter, a logging parameter, a completion parameter, a production parameter, and any combination thereof.

Statement 7: A method according to any one of the preceding Statements 1-6, further comprising: lowering an electromagnetic (EM) logging tool in a wellbore and obtaining, via the EM logging tool, a plurality of measured responses of a downhole pipe to an EM field.

Statement 8: A method according to Statement 7, wherein the EM logging tool emits EM energy from an EM energy source and receives EM energy at a receiver.

Statement 9: A method according to any one of the preceding Statements 1-8, further comprising: performing an inversion on the filtered measured response to determine a metal loss function for pipe characterization depth regions corresponding to a plurality of downhole pipes.

Statement 10: A method according to Statement 9, further comprising calculating thicknesses of a plurality of pipes using the metal loss function.

Statement 11: A method according to Statement 10, further comprising generating a visualization of the thickness of one or more pipes based on the metal loss function.

Statement 12: A method according to any one of the preceding Statements 1-11, wherein the known pipe feature comprises a known material and shape.

Statement 13: A method according to any one of the preceding Statements 1-12, wherein the known pipe feature is selected from the group consisting of: a collar, pipe coupling, sleeve, clamp, fitting, joint, and perforation.

Statement 14: A method according to any one of the preceding Statements 1-13, wherein the known pipe feature comprises a different material than that comprising the one or more pipes, the method further comprising applying a corrective coefficient to the measured response corresponding to the known pipe feature.

Statement 15: A method according to any one of the preceding Statements 1-14, wherein the downhole pipe is selected from the group consisting of: a casing, casing string, tubing, tubular, coiled tubing, filter, and packer.

Statement 16: A method according to any one of the preceding Statements 1-15, further comprising obtaining, using an electromagnetic (EM) logging tool, a plurality of measured responses of each of a plurality of downhole pipes to an EM field.

Statement 17: A system comprising: an electromagnetic (EM) logging tool disposed within a wellbore containing one or more pipes; at least one processor in communication with the EM logging tool, wherein the processor is coupled with at least one memory element containing a set of instructions that when executed by the at least one processor causes the processor to: divide measured responses collected by the EM logging tool into at least two depth regions, at least one depth region corresponding to a non-defected region and at least one depth region corresponding to a pipe characterization region; design a filter that rejects the natural variations of one or more pipes using the measured responses in the at least one depth region corresponding to a non-defected region; apply the filter to the measured response corresponding to the pipe characterization depth region to remove the natural variations of the pipe; and determine a metal loss function for the at least one depth region corresponding to a pipe characterization region, based at least in part on the corresponding measured response and the filter.

Statement 18: A system according to Statement 17, wherein the memory element further contains a set of instructions that when executed by the at least one processor further causes the processor to: further divide the measured responses into at least one depth region corresponding to a known pipe feature region; generate an impulse response function using the measured response corresponding to the known pipe feature region; and generate a metal loss function for the at least one depth region corresponding to a pipe characterization region, based at least in part on the corresponding measured response, the impulse response function, and the filter.

Statement 19: A system according to Statement 17 or Statement 18, wherein the memory element further contains a set of instructions that when executed by the at least one processor further causes the processor to: generate a reconstructed measured response from the filtered measured response by interpolating or extrapolating the filtered measured response using frequencies that are neighboring the frequencies at which filtering is applied.

Statement 20: A system according to any one of the preceding Statements 17-19, wherein the memory element further contains a set of instructions that when executed by the at least one processor further causes the processor to: perform an inversion on the filtered measured response to determine a metal loss function for pipe characterization regions corresponding to a plurality of pipes in the wellbore.

Statement 21: A system according to any one of the preceding Statements 17-20, wherein the memory element further contains a set of instructions that when executed by the at least one processor further causes the processor to: calculate a thickness of a plurality of pipes using the metal loss function.

Statement 22: A system according to any one of the preceding Statements 17-21, wherein the known pipe feature region is selected from the group consisting of: a collar, pipe coupling, sleeve, clamp, fitting, joint, and perforation.

Statement 23: A system according to any one of the preceding Statements 17-22, wherein the one or more pipes is selected from the group consisting of: a casing, casing string, tubing, tubular, coiled tubing, filter, and packer.

Statement 24: An apparatus comprising: an electromagnetic (EM) logging tool capable of obtaining EM log data, the log data comprising a plurality of measured responses; at least one processor in communication with the EM logging tool, wherein the processor is coupled with a non-transitory computer-readable storage medium having stored therein instructions which, when executed by the at least one processor, causes the at least one processor to: divide measured responses collected by the EM logging tool into at least two depth regions, at least one depth region corresponding to a non-defected region and at least one depth region corresponding to a pipe characterization region; design a filter that optimally rejects the natural variations of one or more pipes using the measured responses in the at least one depth region corresponding to a non-defected region; apply the filter to remove natural variations in the measured response corresponding to the pipe characterization region; and determine a metal loss function for the at least one depth region corresponding to a pipe characterization region, based at least in part on the corresponding measured response and the filter.

Statement 25: An apparatus according to Statement 24, wherein the non-transitory computer-readable storage medium further contains a set of instructions that when executed by the at least one processor further causes the processor to: further divide the measured responses into at least one depth region corresponding to a known pipe feature; determine an impulse response function using the measured response corresponding to the known pipe feature; and determine a metal loss function for the at least one depth region corresponding to a pipe characterization region, based at least in part on the corresponding measured response, the impulse response function, and the filter.

Statement 26: An apparatus according to Statement 24 or Statement 25, wherein the non-transitory computer-readable storage medium further contains a set of instructions that when executed by the at least one processor further causes the processor to: generate a reconstructed measured response from the filtered measured response by interpolating or extrapolating the filtered measured response using the frequencies that are neighboring the frequencies at which filtering is applied.

Statement 27: An apparatus according to any one of the preceding Statements 24-26, wherein the non-transitory computer-readable storage medium further contains a set of instructions that when executed by the at least one processor further causes the processor to: perform an inversion on the filtered measured response to determine a metal loss function for pipe characterization regions corresponding to a plurality of pipes in the wellbore.

Statement 28: An apparatus according to any one of the preceding Statements 24-27, wherein the non-transitory computer-readable storage medium further contains a set of instructions that when executed by the at least one processor further causes the processor to: calculate a thickness of a plurality of pipes using the metal loss function.

Statement 29: An apparatus according to any one of the preceding Statements 24-28, wherein the known pipe feature is selected from the group consisting of: a collar, pipe coupling, sleeve, clamp, fitting, joint, and perforation.

We claim:

1. A method comprising:
    obtaining, using an electromagnetic (EM) logging tool, a plurality of measured responses of a downhole pipe to an EM field, the downhole pipe having a non-defected pipe depth region and a pipe characterization depth region;
    designing a filter that rejects the natural variations of the pipe using the measured response corresponding to the non-defected depth region;
    applying the filter to the measured response corresponding to the pipe characterization depth region to remove the natural variations of the pipe;
    generating a metal loss function for the pipe characterization depth region based on the filtered measured response corresponding to the pipe characterization depth region;
    generating an impulse response function based on the measured response corresponding to a known pipe feature; and
    generating a metal loss function for the pipe characterization depth region based at least in part on the filtered measured response corresponding to the pipe characterization depth region and the impulse response function.

2. The method of claim 1, further comprising generating a reconstructed measured response from the filtered measured response by interpolating or extrapolating the filtered measured response using the frequencies that are neighboring the frequencies at which filtering is applied.

3. The method according to claim 1, further comprising:
generating a visualization of the corrosion of one or more pipes based on the metal loss function.

4. The method according to claim 3, further comprising:
adjusting at least one downhole operational parameter based at least in part on the metal loss function.

5. The method according to claim 4, wherein the operational parameter is selected from the group consisting of a drilling parameter, a logging parameter, a completion parameter, a production parameter, and any combination thereof.

6. The method according to claim 5, further comprising:
lowering an electromagnetic (EM) logging tool in a wellbore and obtaining, via the EM logging tool, a plurality of measured responses of a downhole pipe to an EM field.

7. The method according to claim 1, further comprising:
performing an inversion on the filtered measured response to determine a metal loss function for pipe characterization depth regions corresponding to a plurality of downhole pipes.

8. The method according to claim 1, wherein the known pipe feature comprises a known material and shape.

9. The method according to claim 8, wherein the known pipe feature is selected from the group consisting of: a collar, pipe coupling, sleeve, clamp, fitting, joint, and perforation.

10. A system comprising:
an electromagnetic (EM) logging tool disposed within a wellbore containing one or more pipes;
at least one processor in communication with the EM logging tool, wherein the processor is coupled with at least one memory element containing a set of instructions that when executed by the at least one processor causes the processor to:
divide measured responses collected by the EM logging tool into at least two depth regions, at least one depth region corresponding to a non-defected region and at least one depth region corresponding to a pipe characterization region;
design a filter that rejects the natural variations of one or more pipes using the measured responses in the at least one depth region corresponding to a non-defected region;
apply the filter to the measured response corresponding to the pipe characterization depth region to remove the natural variations of the pipe; and
determine a metal loss function for the at least one depth region corresponding to a pipe characterization region, based at least in part on the corresponding measured response and the filter;
further divide the measured responses into at least one depth region corresponding to a known pipe feature region;
generate an impulse response function using the measured response corresponding to the known pipe feature region; and
generate a metal loss function for the at least one depth region corresponding to a pipe characterization region, based at least in part on the corresponding measured response, the impulse response function, and the filter.

11. The system according to claim 10, wherein the memory element further contains a set of instructions that when executed by the at least one processor further causes the processor to:
generate a reconstructed measured response from the filtered measured response by interpolating or extrapolating the filtered measured response using frequencies that are neighboring the frequencies at which filtering is applied.

12. The system according to claim 11, wherein the memory element further contains a set of instructions that when executed by the at least one processor further causes the processor to:
perform an inversion on the filtered measured response to determine a metal loss function for pipe characterization regions corresponding to a plurality of pipes in the wellbore.

13. The system according to claim 12, wherein the memory element further contains a set of instructions that when executed by the at least one processor further causes the processor to:
calculate a thickness of a plurality of pipes using the metal loss function.

14. An apparatus comprising:
an electromagnetic (EM) logging tool capable of obtaining EM log data, the log data comprising a plurality of measured responses;
at least one processor in communication with the EM logging tool, wherein the processor is coupled with a non-transitory computer-readable storage medium having stored therein instructions which, when executed by the at least one processor, causes the at least one processor to:
divide measured responses collected by the EM logging tool into at least two depth regions, at least one depth region corresponding to a non-defected region and at least one depth region corresponding to a pipe characterization region;
design a filter that optimally rejects the natural variations of one or more pipes using the measured responses in the at least one depth region corresponding to a non-defected region;
apply the filter to remove natural variations in the measured response corresponding to the pipe characterization region; and
determine a metal loss function for the at least one depth region corresponding to a pipe characterization region, based at least in part on the corresponding measured response and the filter;
further divide the measured responses into at least one depth region corresponding to a known pipe feature;
determine an impulse response function using the measured response corresponding to the known pipe feature; and
determine a metal loss function for the at least one depth region corresponding to a pipe characterization region, based at least in part on the corresponding measured response, the impulse response function, and the filter.

15. The apparatus according to claim 14, wherein the non-transitory computer-readable storage medium further contains a set of instructions that when executed by the at least one processor further causes the processor to:
generate a reconstructed measured response from the filtered measured response by interpolating or extrapolating the filtered measured response using the frequencies that are neighboring the frequencies at which filtering is applied.

16. The apparatus according to claim 15, wherein the non-transitory computer-readable storage medium further contains a set of instructions that when executed by the at least one processor further causes the processor to:

perform an inversion on the filtered measured response to determine a metal loss function for pipe characterization regions corresponding to a plurality of pipes in the wellbore.

17. The apparatus according to claim 16, wherein the non-transitory computer-readable storage medium further contains a set of instructions that when executed by the at least one processor further causes the processor to:

calculate a thickness of a plurality of pipes using the metal loss function.

* * * * *